Patented June 21, 1927.

1,633,535

UNITED STATES PATENT OFFICE.

CHARLES S. LUSK, OF ALFRED STATION, NEW YORK.

COMBINED TRACK LEVEL AND GAUGE.

Application filed September 3, 1921. Serial No. 498,209.

This invention relates to a combined track gauge and level and particularly to a readily portable device of this class which may be manually operable at will or continuously and automatically operated as when mounted upon a truck and drawn along the track.

One of the objects of the invention is the provision of a track gauge and level in which the indicating instruments are so constructed and related to the track engaging portions of the device as to give a full size indication of variations in the space between the rails, and the difference in level of each rail above and below the mean horizontal plane between their respective levels, and also to impart a movement to the level indicating means which is truly proportional, throughout the range of the level, to the actual variation in elevation of the rails.

Another object of the invention is to provide in an instrument of the class referred to a knock-down construction of parts in order to facilitate packaging and transportation.

A further object of the invention is to construct a truck mounted track gauge in which the truck automatically hugs the rail opposite that side of the track engaged by the measuring device so that the entire deviation in the gauge may be accurately ascertained at the point of measurement.

The invention further comprehends the provision of a simple and efficient construction and arrangement of parts, and other novel features hereinafter more fully described, reference being had to the accompanying drawings in which:—

Figure 1:
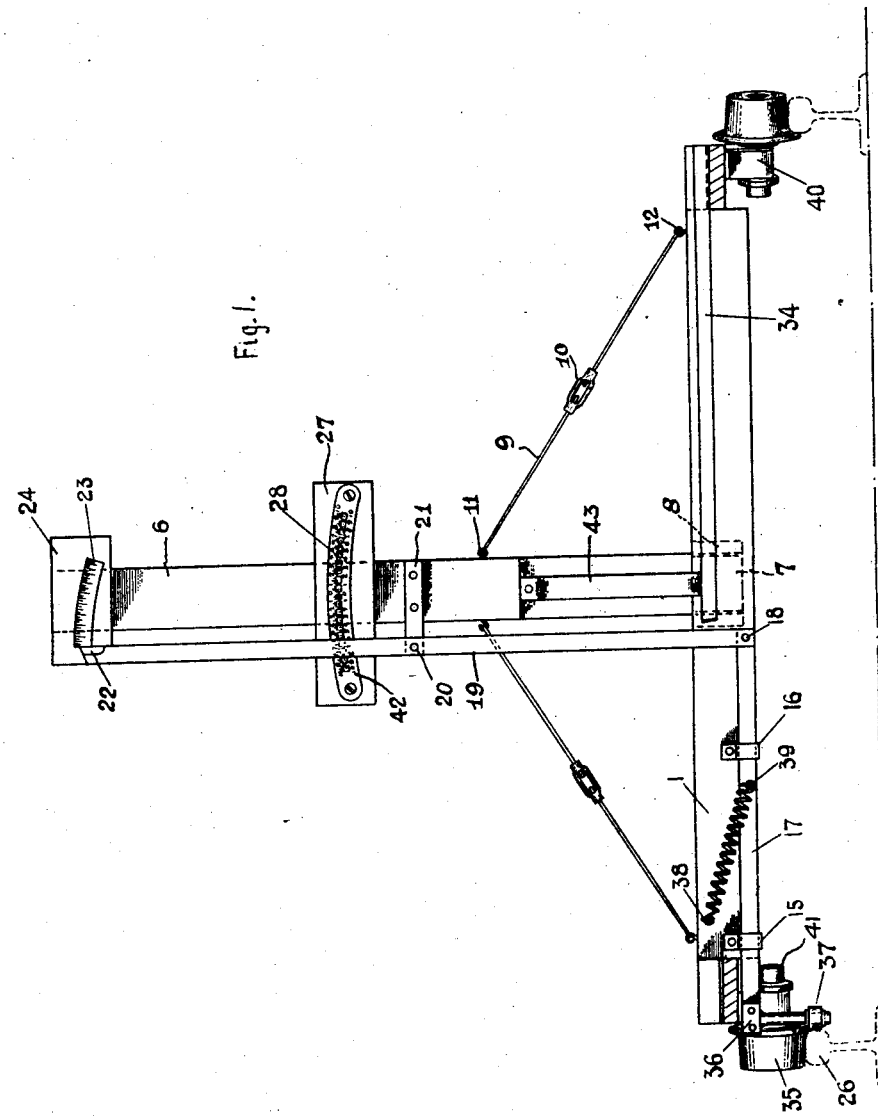

Figure 1 is a front elevation of a track gauge and level embodying the invention.

Figures 2, 3:
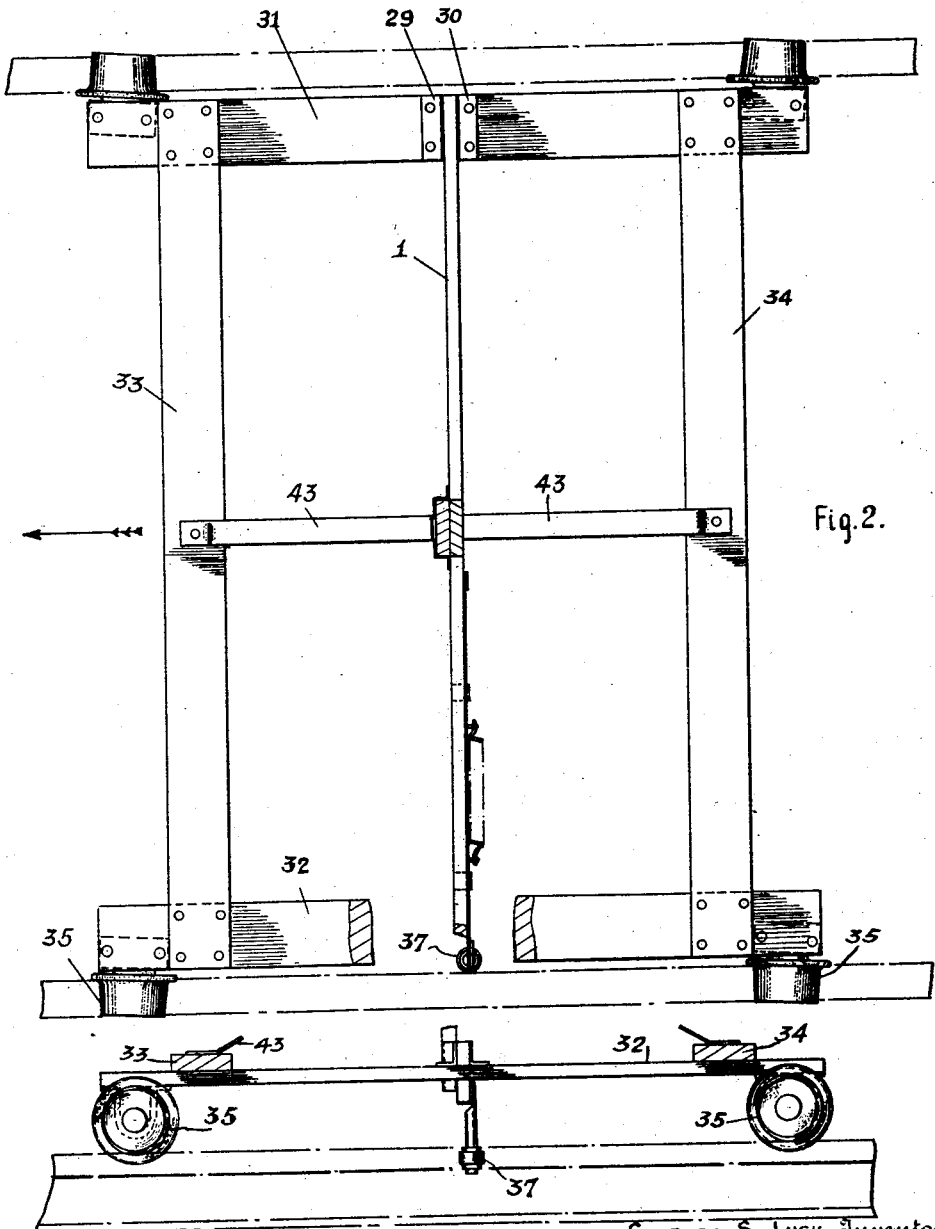

Figure 2 is a plan view of the truck, parts of the track gauge and level being broken away.

Figure 3 is a side elevation of the device shown in Figures 1 and 2.

A truck, formed of side members 31 and 32 and of cross pieces 33 and 34, is mounted on flanged traction wheels 35 which are adapted to roll on the rails to be measured in the manner of a railway car. The flanged wheels 35 are journalled on stub shafts 41 supported in brackets 40 which are carried by the side members 31 and 32 of the truck, adjacent the ends of said side members, and said shafts 41 are inclined in the same direction at a slight angle to the length of the side members of the truck so that, when the truck is drawn along the track in the direction of the arrow (Figure 1), the traction wheels 35 will constantly tend to move the truck toward the track rail opposite to that against which the measurement is to be taken.

A cross-beam 1 has its ends secured in sockets formed by spaced angular lugs 29 and 30 carried by the side members 31 and 32 of the truck. Removably secured to the cross-beam at its middle portion, is a standard 6, the lower end 7 of which is connected to the cross beam. In the present instance the lower end of the standard 6 is shown in Figure 1 as seated within a metallic socket 8 bolted to the rear surface of the cross-beam 1. Means are provided for holding the standard 6 in vertical position relative to the length of the cross-beam, the means shown comprising adjustable members 9 formed of divided rods threaded at their inner ends and adjustably held together by a turn-buckle 10. The upper or outer ends of these rods are suitably secured to opposite sides of the standard 6 as by screw eyes 11 and at their lower ends are similarly attached to the cross beam 1 as by screw hooks 12 fixed to the cross-beam 1. The standard 6 is also supported by brackets 43, each of which has one end connected to said standard and its other end connected to one of the cross-pieces 33 and 34.

A gauge bar 17 is mounted to slide longitudinally of the cross-beam 1 in clips 15 and 16 carried by said cross-beam. Said gauge bar carries at its outer end a depending bracket 36, which bracket has a roller 37 journalled at its lower end. The roller 37 is maintained in engagement with the inner surface of the head of one of the rails 36 by a spring which has one end connected at 38 to the cross-beam 1 and its other end connected at 39 to the gauge bar 17.

The inner end of the gauge bar 17 is pivotally connected at 18 to an upright lever 19, said lever 19 being pivotally mounted at a point 20 approximately midway of its length on the bracket 21 which is shown as bolted to the standard 6. The upper end of the lever 19 is preferably beveled as at 22 forming with an edge thereof an acute angle which constitutes a pointer traveling in proximity to the gauge scale 23. This scale is mounted on a transversely extending rectangular head 24 suitably screwed or otherwise fastened at the upper end of the standard 6.

Secured to the standard 6 is a transverse member 27 carrying a curved spirit level 28 by means of which the difference in elevation of the opposite rails is ascertained. As the standard gauge of a railroad track is 4′ 10″, the curvature of the spirit level 28 follows that of a circle having a radius of 2′ 5″ said spirit level being located on the circumference of such a circle having its center in a plane passing through the points of engagement of the tread surfaces of the wheels 35 with the tread surfaces of the track rails and a radius of a length equal to one-half the gauge of the track, said center being measured inwardly from the point at which the roller 37 would engage the inner surface of a rail of standard gauge. By this disposition of parts it follows that the lateral displacement of the bubble in the spirit level 28 for any deviation of the rails above or below a horizontal plane passing through the center of the leveling surface will be equal in length to the depression and elevation respectively of the opposite rails relative to said horizontal plane and also that the movement of the bubble will be truly proportional to the actual variation in the level of the rails. But since the difference in elevation of said rails relative to each other is the sum of their respective elevation and depression relative to said horizontal plane, it follows that the distance traversed by the bubble will be one-half the actual difference of elevation of the opposite rails. Therefore, the scale of the spirit level is made one-half inch to the inch so that the reading of said scale will be an actual reading of the difference in elevation of said rails.

The curved tube of the spirit level is preferably covered with a protective cage comprising a metallic casing 42, having cut-out portions to expose the bubble of the level, separated by narrow bars indicating the inches. Sub-divisions of the units of measurement are engraved on the casing.

It is obvious that a slight inaccuracy in the gauge reading will arise from the fact that the lower end of the lever 19 travels through an arc lifting the inner end of the gauge bar 17, this being permitted by slight play between the clips 15 and 16 and the gauge bar which results in a slight rocking movement of the outer end of the gauge bar 17 against the inner surface of the tread portion of the rail 26. This of course may be obviated by having the inner end of the gauge bar toothed to engage an arcuate toothed segment on the lower end of the lever 19. But since the arc traversed by the lower end of the lever 19 is very small, the lifting moment of the end of the gauge bar 17 is negligible, the gauge reading being sufficiently accurate for all practical purposes. The simplicity of the present construction outweighs whatever slight advantage might result from the increase in accuracy which would follow the use of a more complicated connection between the lower ends of the lever 19 and the gauge bar 17, although it is well within the scope of the invention to use such a construction if found desirable.

Although I have thus described the preferred embodiment of my invention, it is evident that those skilled in the arts to which this relates may make various changes in the construction, combination and arrangement of the several parts without departing from the spirit and scope of the invention.

Having described my invention what I claim as new and desire to secure by Letters Patent, is:—

In a track gauge, a truck, a transverse beam carried by said truck and forming therewith a cross member for bridging the space between opposite rails of a railway track, flanged wheels carried by said truck, the treads of said wheels forming rail-tread engaging surfaces, and the flanges of the wheels on one side of said truck constituting shoulders for engaging the inner surface of the rail-tread of the adjacent rail, at least some of said wheels being inclined at such an angle to the longitudinal direction of said track as to maintain said rail-engaging shoulders in constant contact with said adjacent rail through forward motion of said truck, a gauge bar slidably supported by said transverse beam, the outer end of said gauge bar being engageable with the inner surface of the tread portion of the opposite rail, a spring for urging said gauge bar outwardly, a scale, and means for registering lateral movement of said gauge bar upon said scale.

In testimony whereof I have hereunto set my hand.

CHARLES S. LUSK.